(12) United States Patent
Eckett et al.

(10) Patent No.: US 10,927,696 B2
(45) Date of Patent: Feb. 23, 2021

(54) COMPRESSOR CASE CLEARANCE CONTROL LOGIC

(71) Applicant: United Technologies Corporation, Farmington, CT (US)

(72) Inventors: Christopher A. Eckett, Simsbury, CT (US); William K. Ackermann, East Hartford, CT (US)

(73) Assignee: RAYTHEON TECHNOLOGIES CORPORATION, Waltham, MA (US)

( * ) Notice: Subject to any disclaimer, the term of this patent is extended or adjusted under 35 U.S.C. 154(b) by 117 days.

(21) Appl. No.: 16/165,235

(22) Filed: Oct. 19, 2018

(65) Prior Publication Data
US 2020/0123923 A1  Apr. 23, 2020

(51) Int. Cl.
*F01D 11/24* (2006.01)
*F01D 21/14* (2006.01)

(52) U.S. Cl.
CPC .............. *F01D 11/24* (2013.01); *F01D 21/14* (2013.01); *F05D 2220/323* (2013.01); *F05D 2240/10* (2013.01); *F05D 2260/20* (2013.01); *F05D 2270/07* (2013.01); *F05D 2270/301* (2013.01); *F05D 2270/44* (2013.01)

(58) Field of Classification Search
None
See application file for complete search history.

(56) References Cited

U.S. PATENT DOCUMENTS

| | | | |
|---|---|---|---|
| 4,363,599 A | 12/1982 | Cline et al. | |
| 4,576,547 A | 3/1986 | Weiner et al. | |
| 4,648,241 A | 3/1987 | Putman et al. | |
| 8,894,358 B2 * | 11/2014 | Bacic | F01D 11/20 415/126 |
| 9,157,331 B2 * | 10/2015 | Laurello | F01D 11/24 |
| 9,260,974 B2 | 2/2016 | Hasting et al. | |
| 9,840,932 B2 * | 12/2017 | Ballard, Jr. | F01D 11/24 |

(Continued)

FOREIGN PATENT DOCUMENTS

| | | |
|---|---|---|
| EP | 3216987 A1 | 9/2017 |
| GB | 2169962 A | 7/1986 |
| WO | 2015153171 A1 | 10/2015 |

OTHER PUBLICATIONS

Search Report for European Application No. 19204443.6; Application Filing Date Oct. 21, 2019; dated Mar. 3, 2020 (6 pages).

*Primary Examiner* — Justin D Seabe
*Assistant Examiner* — Jason G Davis
(74) *Attorney, Agent, or Firm* — Cantor Colburn LLP

(57) ABSTRACT

A gas turbine engine includes a compressor section having a first portion and an aft portion. A compressor case clearance (CCC) control system is configured to adjust an amount of bleed air delivered to the front portion and the aft portion based on an in-flight phase of an aircraft. In response to invoking a first mode, the CCC control system delivers air to both the front portion and the aft portion. In response to invoking a second mode, the CCC control system reduces the amount of air delivered to the aft portion prior to transitioning from the cruise phase to the descent phase. Accordingly, clearance areas within the compressor section can be selectively increased during specific portions of the flight to avoid contact between blade tips and the engine case.

16 Claims, 5 Drawing Sheets

(56) References Cited

U.S. PATENT DOCUMENTS

| | | | |
|---|---|---|---|
| 10,393,149 B2* | 8/2019 | Mondal | F01D 11/24 |
| 10,414,507 B2* | 9/2019 | Schelfaut | F01D 11/24 |
| 10,415,421 B2* | 9/2019 | Arnold | F01D 11/24 |
| 2009/0037035 A1* | 2/2009 | Hershey | F01D 11/24 |
| | | | 701/3 |
| 2015/0247417 A1* | 9/2015 | Bacic | F04D 29/164 |
| | | | 415/1 |
| 2016/0311546 A1 | 10/2016 | Adibhatla et al. | |
| 2017/0114725 A1* | 4/2017 | Holt | F01D 11/24 |
| 2017/0248028 A1 | 8/2017 | Schilling | |
| 2017/0268535 A1 | 9/2017 | Mondal et al. | |
| 2018/0266269 A1* | 9/2018 | Blakeman | F01D 11/14 |

* cited by examiner

COMPRESSOR CASE CLEARANCE CONTROL LOGIC

BACKGROUND

The subject matter disclosed herein generally relates to aircraft propulsion systems, and more particularly, to gas turbine engines.

Gas turbine engines include rotors that rotate within an engine case. The rotor blade tip clearances have a significant influence on engine performance Leakage past the blade tips can be minimized by maintaining a desired or predetermined clearance between the blade tips and the case. Clearance can be selectively increased during specific portions of the flight to avoid contact between blade tips and the case. Accordingly, thrust specific fuel consumption of the engine is thereby reduced and engine durability can be increased.

BRIEF DESCRIPTION

According to a non-limiting embodiment, a gas turbine engine comprises a compressor section including a front portion and an aft portion. A compressor case clearance (CCC) control system is configured to adjust an amount of bleed air delivered to the front portion and the aft portion based on an in-flight phase of an aircraft.

According to another non-limiting embodiment an aircraft compressor case clearance (CCC) control system comprises a valve that is disposed between a front portion and an aft portion included in a compressor section of a gas turbine engine. The valve is adjustable among a plurality of different positions. A CCC controller is in signal communication with the valve. The CCC controller is configured to determine an in-flight phase of an aircraft operating the gas turbine engine, and to select a position of the valve among the plurality of different position based on the in-flight phase to control delivery of bleed air from the front portion to the aft portion.

According to another non-limiting embodiment, a method is provided to control compressor case clearance in a gas turbine engine. The method comprises disposing a valve between a front portion and an aft portion included in a compressor section of a gas turbine engine. The method further includes determining, via a CCC controller, an in-flight phase of an aircraft operating the gas turbine engine. The method further includes selecting, via the CCC controller, a position of the valve among the plurality of different position based on the in-flight phase. The method further includes delivering an amount of bleed air from the front portion to the aft portion based on the position of the valve, and varying a dimension of the compressor section based on the amount of delivered bleed air to control the compressor case clearance.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Compressor case clearance (CCC) control systems are employed in gas turbine engines to control throttle blade clearances. These compressor case clearance control systems can actively control the clearance between the case and blade tips. Known CCC control systems, however, do not determine optimal times at which to begin adjusting the clearance dimensions of the engine case. As a result, the efficiency of thrust specific fuel consumption is not maximized.

Various non-limiting embodiments described herein provide a CCC control system that selectively delivers cool, mid-stage compressor bleed air over the aft case based on the current in-flight phase such as, for example, cruise, climb, pre-descent, etc. By controlling the delivery of the bleed air, the temperature of the engine case can be actively varied, thereby actively controlling the clearance dimensions (e.g., shrinking or expanding) of the engine case.

According to at least one non-limiting embodiment, a CCC control system selectively activates and deactivates a CCC cooling mode to adjust delivery of cool bleed air through the compression section of a gas turbine engine. The CCC control system includes a controller that deactivates the CCC cooling mode near the end of a cruise phase and prior to a decent or a climb. By doing so the CCC control system can prevent the aircraft's step-climb phase from causing the CCC exit air pressure to fall below the pressure limit for customer bleed, which would otherwise force a switch to the high pressure (compressor exit) customer bleed source. The deactivation of the CCC cooling mode near the end of a cruise phase may also avoid performance penalties that would otherwise occur by prematurely switching to high pressure bleed. In addition, deactivating the CCC cooling mode before starting descent can avoid the risk of rubbing out the compressor (i.e., contacting the rotor blades with the engine case) at the top of descent clearance pinch point. In the manner, the stability and integrity of the compressor hardware can be improved.

Figure 1:
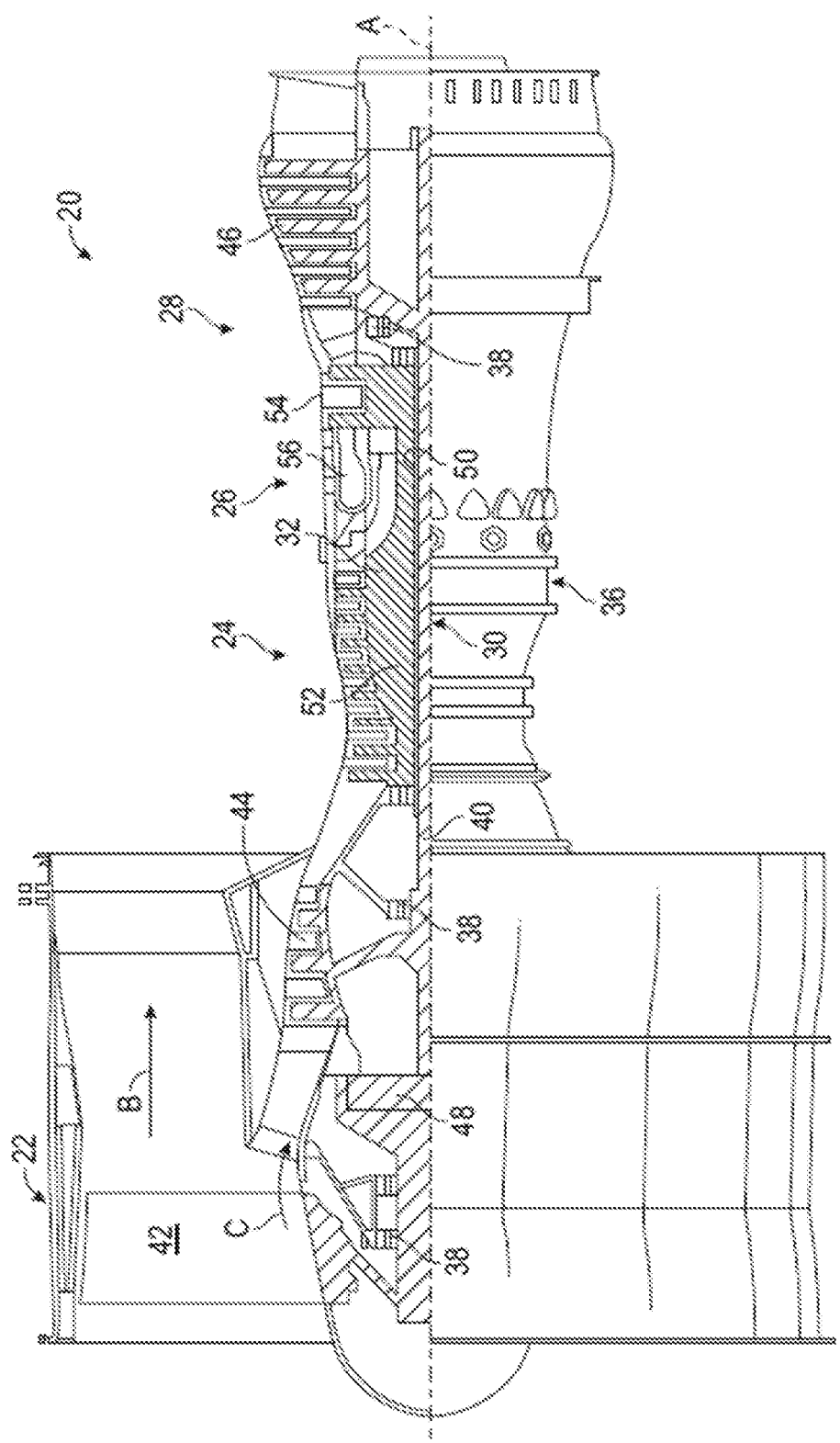
FIG. 1 is a partial cross-sectional illustration of a gas turbine engine, in accordance with an embodiment of the disclosure.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis "A" which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram° R)/(518.7° R)]^0.5$. The "Low corrected fan tip speed" as disclosed herein according to one non-limiting embodiment is less than about 1150 ft/second (350.5 m/sec).

While the example of FIG. 1 illustrates one example of the gas turbine engine 20, it will be understood that any number of spools, inclusion or omission of the gear system 48, and/or other elements and subsystems are contemplated. Further, rotor systems described herein can be used in a variety of applications and need not be limited to gas turbine engines for aircraft applications. For example, rotor systems can be included in power generation systems, which may be ground-based as a fixed position or mobile system, and other such applications.

Figure 2A:
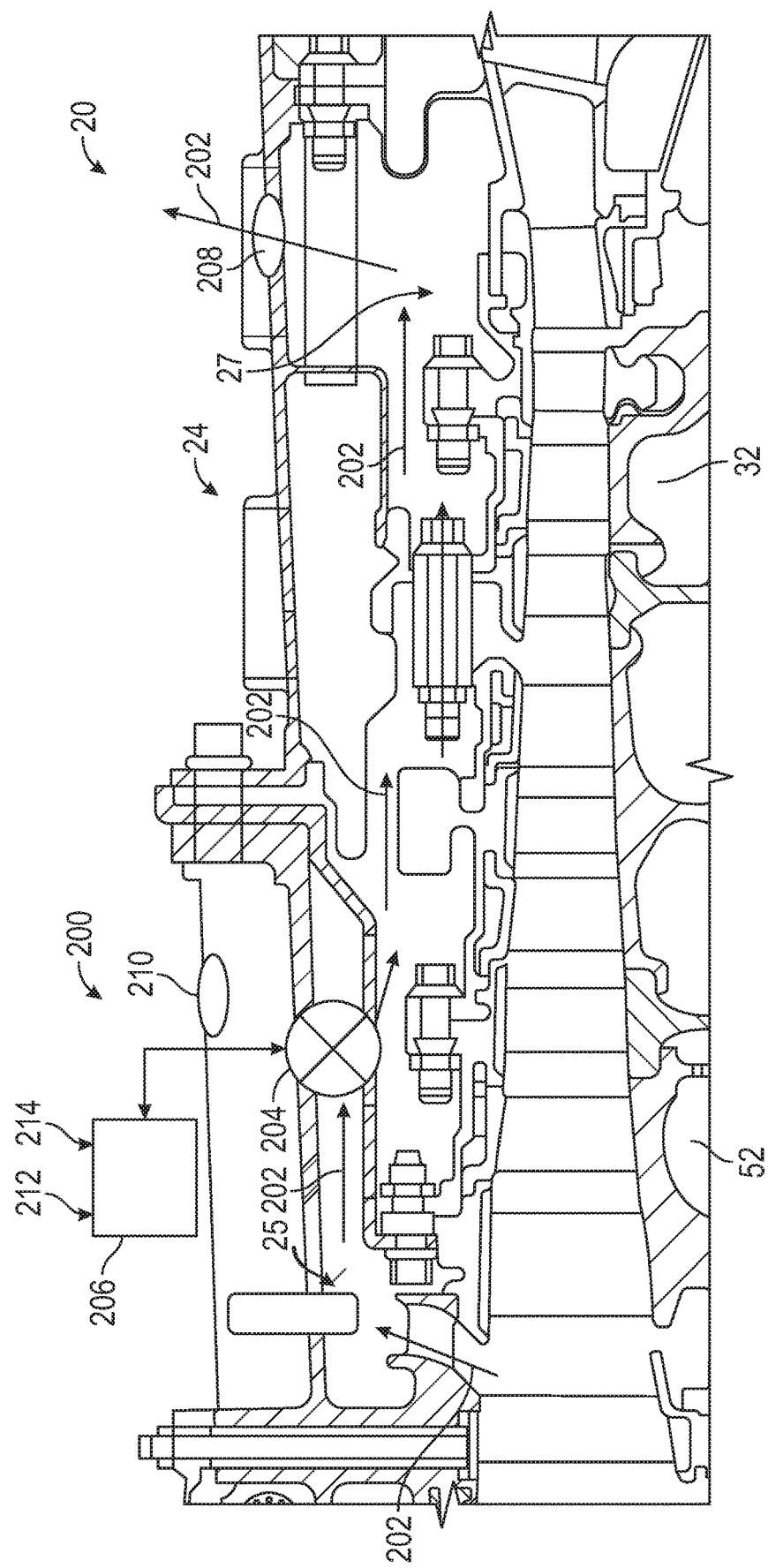
FIG. 2A illustrates a compressor case clearance control system operating in a first mode according to a non-limiting embodiment.
Figure 2B:
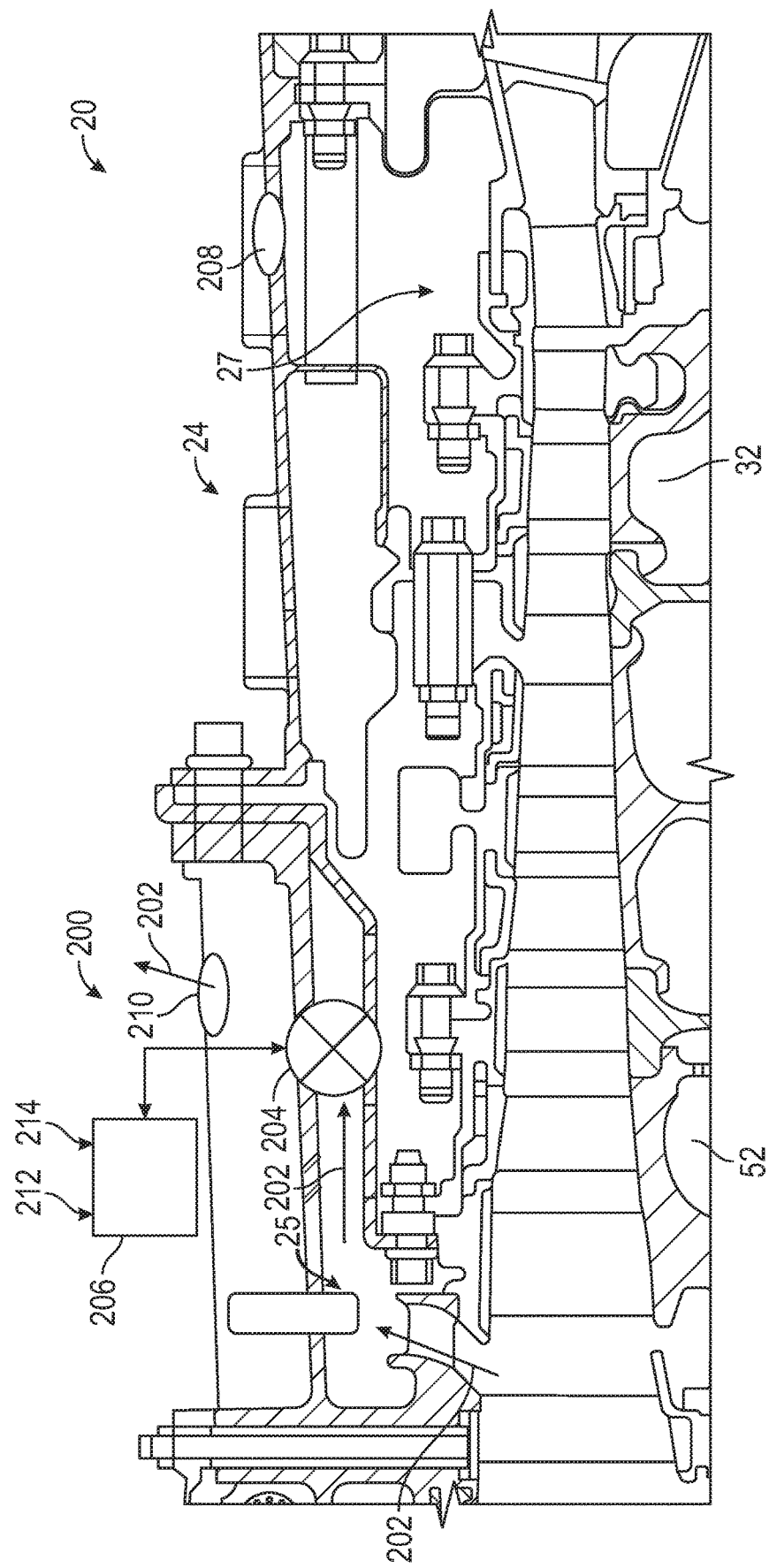
FIG. 2B illustrates the compressor case clearance control system operating in a second mode according to a non-limiting embodiment.

Turning now to FIGS. 2A and 2B, a CCC control system 200 is illustrated according to a non-limiting embodiment. The compressor section 24 includes a front portion 25 and an aft portion 27. The CCC control system 200 is configured to adjust an amount of cool, mid-stage compressor bleed air 202 (referred to herein as bleed air 202) delivered to the front portion 25 and the aft portion 27 based on an in-flight phase of the aircraft. In at least one embodiment, the CCC control system 200 determines a transition time at which the in-flight phase transitions from a cruise phase to a descent phase, and adjusts the amount of bleed air 202 delivered prior to initiating the descent phase to adjust a clearance area of the compressor section 24. For example, the CCC control system 200 can deliver bleed air 202 to both the front portion 25 and the aft portion 27 during the aircraft's' cruise phase, and can reduce the amount of bleed air 202 or completely block the bleed air 202 delivered to the aft portion 27 prior to transitioning from the cruise phase to the descent phase.

The CCC control system 200 includes a CCC valve 204 and a CCC controller 206. The CCC valve 204 is disposed between the front portion 25 and the aft portion 27, and is adjustable among a plurality of different positions. In at least one embodiment, the CCC valve 204 is constructed as a butterfly valve operable in a first position and a second position. The first position delivers the bleed air 202 along a first airflow path that is in fluid communication with an aft exit port 208 installed in the aft portion 27. The second position delivers the bleed air 202 along a second airflow path that is in fluid communication with a front exit port 210 installed in the front portion 25. The bleed air 202 controls the temperature realized by the surrounding areas of the compressor section (e.g., the front portion 25 and the aft portion 27). In other words, the amount of bleed air 202 delivered to the first airflow path controls the temperature of the aft portion 27.

In at least one embodiment, the first position of the CCC valve 204 delivers the bleed air 202 to both the front portion 25 and the aft portion 27 (see FIG. 2A), while the second position delivers the bleed air 202 to the front portion 25 and blocks the bleed air 202 from reaching the aft portion 27 (see FIG. 2B). Accordingly, when the CCC valve 204 is adjusted into the first position (FIG. 2A), the aft portion 27 is cooled. As a result, the dimensions of the compressor section 24 are reduced (i.e., shrinks the compressor section 24) around the rotating compressor blades and the clearance between the engine case and blade tips is minimized. When, however, the CCC valve 204 is adjusted into the second position (FIG. 2B), the bleed air is blocked from reaching the aft portion 27. As a result, the temperature of the aft portion 27 increases thereby increasing the dimensions of the aft portion 27 (i.e., expand the compressor section 24). In this manner, the blade tips are prevented from contacting the engine case.

In the example described above, the CCC valve 204 is illustrated as being located inside the compressor, between the inner and outer cases, to redirect the air 202 before it reaches exit ports 208 or 210. The location of the CCC valve 204, however, is not limited thereto. In another non-limiting embodiment, the CCC valve 204 can be located outside the compressor, with ducts from the exit ports 208 and 210 being connected to the valve 204. In this manner, the CCC valve 204 can actively block or reduce airflow through the duct of a respective connecting port 208 or 210 so as to control the clearance of the compressor section 24 as described herein.

The CCC controller 206 is in signal communication with the CCC valve 204. The CCC controller 206 is configured to select a position of the CCC valve 204 based on the in-flight phase 212 of the aircraft (e.g., cruise, climb, pre-descent, etc.) The in-flight phase 212 can be determined according to a predetermined flight log, which is typically loaded into the flight control system and can be obtained by the CCC controller 206. The in-flight phase 212 can also be manually selected by an operator of the aircraft. In response to selecting the in-flight phase, a control signal indicative of the selected in-flight phase 212 can be delivered to the CCC controller 206. In either case, the controller 206 is made aware of the time at which the aircraft will transition between different in-flight phases, e.g., when the aircraft will transition from a cruise phase to a descent phase. Accordingly, the CCC controller 206 monitors the in-flight phase 212 of the aircraft to determine when a current in-flight will end (e.g., a cruise phase) and when the next in-flight phase (e.g., a descent phase) will begin.

The CCC controller 206 can selectively activate or deactivate the cooling mode by monitoring the phase transition time. When the descent transition time has not yet been reached, for example, the CCC controller 206 invokes of the CCC cooling mode and maintains the CCC valve into the first position. Accordingly, the bleed air 202 is permitted to flow through both the front portion 25 and the aft portion 27 before exiting the compressor section 24 via the aft exit port 208 (see FIG. 2A). When, however, the descent transition time is reached, the CCC controller 206 deactivates the cooling mode and adjusts the CCC valve 204 into the second position to reduce or fully block the amount of bleed air 202 delivered to the aft portion 27 (see FIG. 2B). As a result, the temperature of the aft portion 27 is increased so as to increase the dimensions of the compressor section 24. In this manner, the blade tips are prevented from contacting the engine case.

The CCC control system 200 can also selectively activate or deactivate the cooling mode to prevent the aircraft's step-climb phase from causing the CCC bleed air pressure to fall below a pressure requirement set for customer bleed usage. For example, a portion of the bleed air can be diverted to an environmental control system (ECS) (not shown). The bleed air can then further be divided into low-pressure bleed air and high-pressure bleed air. In general, the ECS utilizes the bleed air (e.g., high-pressure bleed air and low-pressure bleed air) to control temperatures of various areas of the aircraft such as the cabin, flight decks, cargo compartments and avionics.

The ECS typically aims to utilize the high-pressure bleed air and the low-pressure bleed air at particular times of flight in order to ensure air pressure requirements are satisfied. However, the aircraft's step-climb scheme can cause the air pressure to fall below the minimum pressure limit for customer air bleed, which would otherwise force an undesirable switch to the high pressure (compressor exit) customer bleed source.

In at least one embodiment, the CCC control system 200 can adjust the amount of bleed air 202 delivered through the front portion 25 and the aft portion 27 based on the in-flight phase 212 of an aircraft (e.g., the step-climb scheme) and/or a comparison of a pressure value 214 of the bleed air and a bleed air pressure threshold. The CCC controller 206 can obtain the step-climb scheme for the current flight log and determine pressure changes 214 the aircraft and/or bleed air are expected to realize during the flight. For example, a step-climb scheme for a given flight may include a series of altitude gains (sometimes referred to as climbs) in order to achieve an optimal flight altitude for improving fuel economy.

A given step-climb scheme typically presets or schedules the altitude gains for a given flight pattern. Therefore, the CCC controller 206 can predict the changes in altitude and pressures 214 and/or can calculate the changes in pressure expected over the course of a flight. Although not illustrated, the CCC controller 206 is in signal communication with various sensors and/or diagnostic systems to obtain various pressure measurements 214 (external air pressure, internal ambient pressures, etc.). The CCC controller 206 can compare the determined pressures to one or more pressure thresholds (e.g., the ECS minimum pressure threshold) to determine when to deactivate the CCC cooling mode. Accordingly, the CCC controller 206 can deactivate the cooling mode prior to invoking a scheduled altitude gain in order to ensure minimum bleed air pressure requirements are satisfied.

Figure 3:
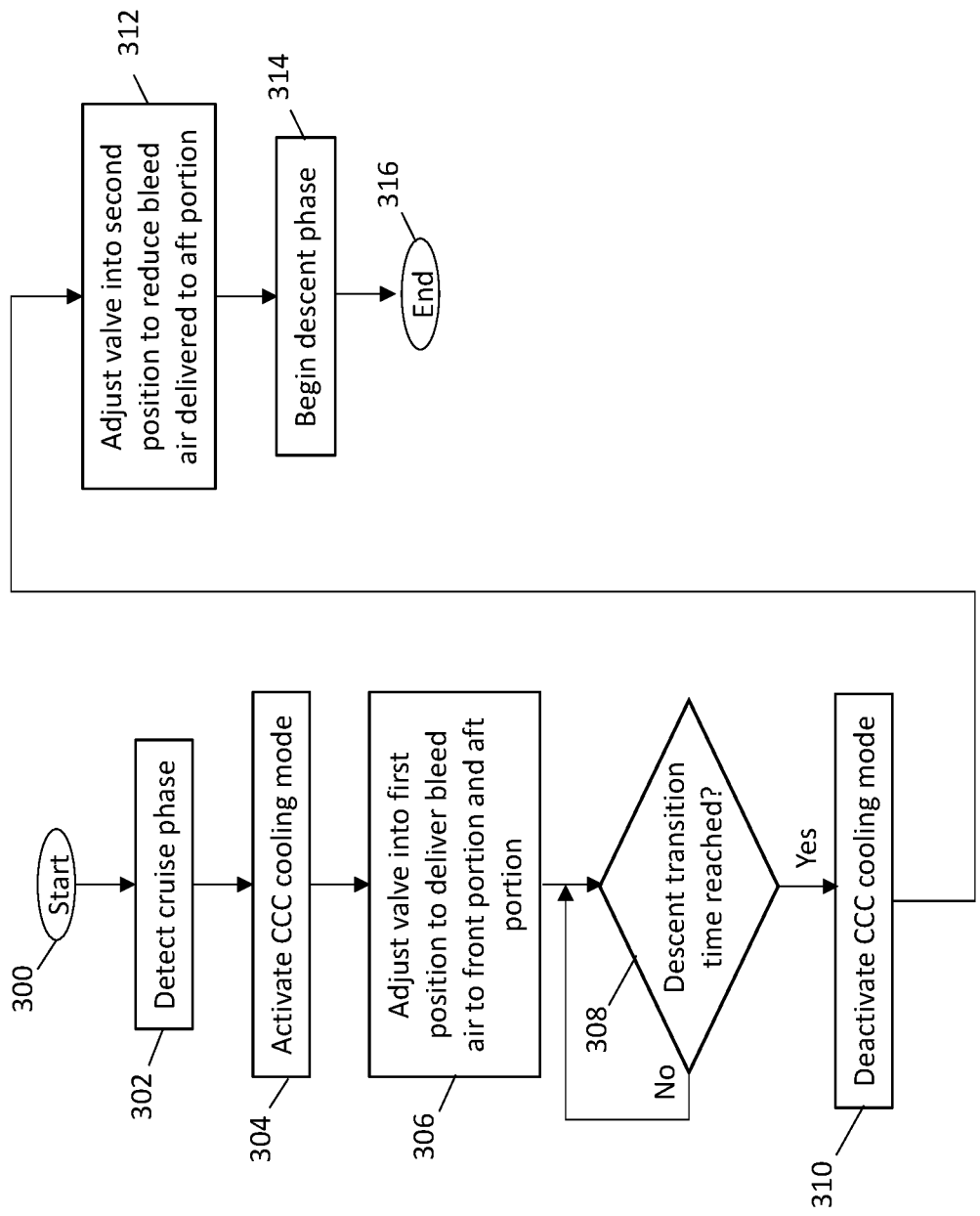
FIG. 3 is a flow diagram illustrating a method of controlling compressor case clearance in a gas turbine engine according to a non-limiting embodiment.

Referring to FIG. 3, a method of controlling compressor case clearance in a gas turbine engine is illustrated according to a non-limiting embodiment. The method begins at operation 300 and at operation 302 the cruise phase of an aircraft is detected. At operation 304, the cooling mode of the CCC control system is activated. In response to activating the CCC cooling mode, the CCC valve is adjusted into a first position at operation 306 so that bleed air is delivered to both the front portion and the aft portion of the compressor section. Accordingly, cool air is delivered into the aft portion, which in turn reduces the dimensions of the engine case (i.e., shrinks the engine case) around the rotating compressor blades and minimizes the clearance between the case and blade tips. At operation 308, the CCC control system monitors the in-flight phase of the aircraft to determine whether a descent transition time is reached. When the descent transition time has not yet been reached, the CCC control system continues monitoring the in-flight phase at operation 308.

When, however, the descent transition time is reached, the CCC cooling mode is deactivated at operation 310. At operation 312, the CCC valve is adjusted into a second position to reduce the amount of bleed air delivered to the aft portion of the compressor section. Accordingly, the temperature of the aft portion is increased which in turn increases the dimensions of the engine case (i.e., expand the engine case). In this manner, the blade tips are prevented from contacting the engine case. At operation 314, the descent phase of the aircraft is initiated, and the method ends at operation 316. While the above description has described the flow process of FIG. 3 in a particular order, it should be appreciated that unless otherwise specifically required in the attached claims that the ordering of the steps may be varied.

Figure 4:
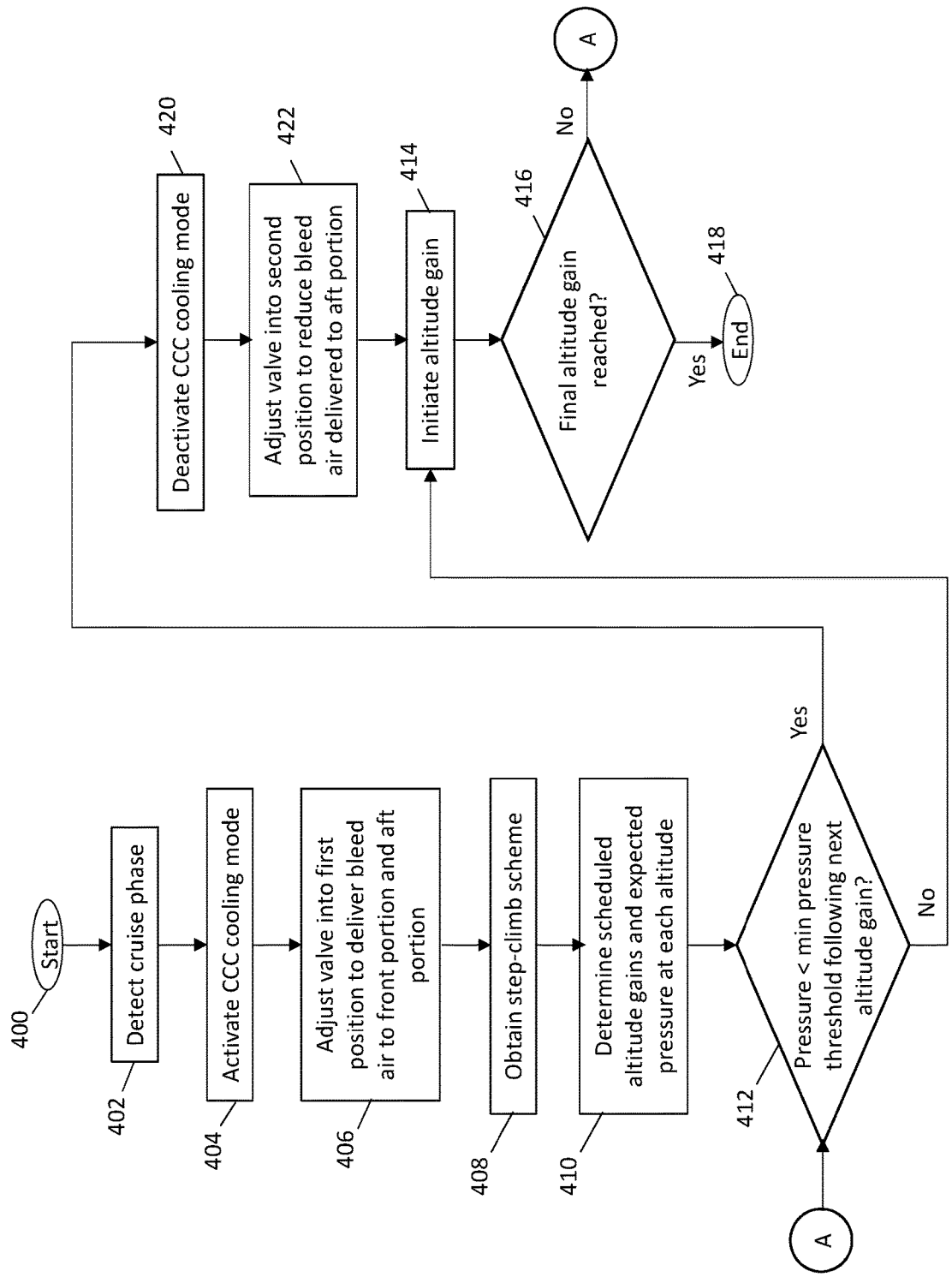
FIG. 4 is a flow diagram illustrating a method of controlling compressor case clearance in a gas turbine engine according to another non-limiting embodiment.

Turning to FIG. 4, a method of controlling compressor case clearance in a gas turbine engine is illustrated according to another non-limiting according to a non-limiting embodiment. The method begins at operation 400 and at operation 402 the cruise phase of an aircraft is detected. At operation 404, the cooling mode of the CCC control system is activated. In response to activating the CCC cooling mode, the CCC valve is adjusted into a first position at operation 406 so that bleed air is delivered to both the front portion and the aft portion of the compressor section. Accordingly, cool air is delivered into the aft portion, which in turn reduces the dimensions of the engine case (i.e., shrinks the engine case) around the rotating compressor blades and minimizes the clearance between the case and blade tips. At operation 408 the step-climb scheme for the current flight is obtained, and the expected pressures according to the scheduled altitude gains are determined at operation 410.

At operation 412, the expected pressure corresponding to the next altitude gain is compared to a minimum pressure threshold (e.g., a minimum bleed air threshold requirement). When the expected pressure is not less than the minimum pressure threshold, the scheduled altitude gain is initiated at operation 414. At operation 416 a determination is made as to whether the final altitude gain included in the step-climb scheme has been reached. When the final altitude gain has been reached, the method ends at operation 418. When, however, the final altitude gain has not been reached, the method returns to operation 412 and the expected pressure corresponding to the next altitude gain is compared to a minimum pressure threshold (e.g., a minimum bleed air threshold requirement).

Turning again to operation 412, when the expected pressure is greater than the minimum pressure threshold, the CCC cooling mode is deactivated at operation 420. At operation 422, the CCC valve is adjusted into a second position to reduce the amount of bleed air delivered to the aft portion of the compressor section. Accordingly, the temperature of the aft portion is increased so as to increase the dimensions of the engine case (i.e., expand the engine case). After adjusting the amount of bleed air delivered to the aft portion, the scheduled altitude gain is initiated at operation 414. At operation 416 a determination is made as to whether the final altitude gain included in the step-climb scheme has been reached. When the final altitude gain has been reached, the method ends at operation 418. When, however, the final altitude gain has not been reached, the method returns to operation 412 and the expected pressure corresponding to the next altitude gain is compared to a minimum pressure threshold (e.g., a minimum bleed air threshold requirement). While the above description has described the flow process of FIG. 4 in a particular order, it should be appreciated that unless otherwise specifically required in the attached claims that the ordering of the steps may be varied.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A gas turbine engine comprising:
   a compressor section including a front portion and an aft portion;
   a compressor case clearance (CCC) control system configured to adjust an amount of bleed air delivered to the front portion and the aft portion based on an in-flight phase of an aircraft;
   a valve that is disposed between the front portion and the aft portion, and that is operable in a first position to deliver the bleed air to both the front portion and the aft portion, and a second position to deliver the bleed air to the front portion while blocking the bleed air from reaching the aft portion; and
   wherein the CCC control system includes a CCC controller in signal communication with the valve, the CCC controller configured to determine the in-flight phase and a transition time at which the in-flight phase transitions from a cruise phase to a descent phase, and to select the second position of the valve based on the transition time.

2. The gas turbine engine of claim 1, wherein the CCC control system adjusts the amount of bleed air delivered to the aft portion prior to transitioning to the descent phase to adjust a clearance area of the compressor section.

3. The gas turbine engine of claim 2, wherein the CCC control system delivers air to both the front portion and the aft portion during the cruise phase, and reduces the amount of air delivered to the aft portion prior to transitioning from the cruise phase to the descent phase.

4. The gas turbine engine of claim 1, wherein the CCC controller selects the first and second positions of the valve based on the in-flight phase and a current pressure of the bleed air at a current altitude.

5. An aircraft compressor case clearance (CCC) control system comprising:
   a valve that is disposed between a front portion and an aft portion included in a compressor section of a gas turbine engine, the valve being adjustable among a plurality of different positions, the plurality of different positions including a first position to deliver the bleed air to both the front portion and the aft portion, and a second position to deliver the bleed air to the front portion while blocking the bleed air from reaching the aft portion; and a CCC controller in signal communication with the valve, the CCC controller configured to determine an in-flight phase of an aircraft operating the gas turbine engine, and to select a position of the valve among the plurality of different position based on the in-flight phase to control delivery of bleed air from the front portion to the aft portion,
wherein the CCC controller selects the second position based on a transition time at which the in-flight phase will transition from a cruise phase to a descent phase.

6. The aircraft CCC control system of claim 5, wherein the in-flight phase is determined according to a predetermined flight log.

7. The aircraft CCC control system of claim 6, wherein the CCC controller selects the position of the valve among the plurality of different positions based on the in-flight phase and a current pressure of the bleed air at a current altitude.

8. The aircraft CCC control system of claim 7, wherein the CCC controller selects the second position in response to determining that transitioning the in-flight phase will reduce the current pressure of the bleed air below a pressure threshold value.

9. A method of controlling compressor case clearance in a gas turbine engine, the method comprising:
disposing a valve between a front portion and an aft portion included in a compressor section of a gas turbine engine;
determining, via a CCC controller, an in-flight phase of an aircraft operating the gas turbine engine;
selecting, via the CCC controller, a position of the valve among a first position and a second position based on the in-flight phase, wherein selecting the position of the valve includes selecting the second position in response to determining a transition in the in-flight phase will reduce the current pressure of the bleed air below a pressure threshold value;
delivering an amount of bleed air from the front portion to the aft portion based on the position of the valve; and
varying a dimension of the compressor section based on the amount of delivered bleed air to control the compressor case clearance.

10. The method of claim 9, wherein varying the dimension of the compressor section includes adjusting a temperature of the compressor section in response to the delivery of the bleed air.

11. The method of claim 10, wherein the dimension of the compressor case clearance expands or contracts based on the temperature.

12. The method of claim 11, wherein selecting a position of the valve further comprises:
adjusting the valve into the first position to deliver the bleed air along a first airflow path that is in fluid communication with an aft exit port installed in the aft portion; and
adjusting the valve into the second position to deliver the bleed air along a second airflow path that is in fluid communication with a front exit port installed in the front portion.

13. The method of claim 12, further comprising determining the in-flight phase based on a predetermined flight log.

14. The method of claim 13, further comprising selecting the position of the valve based on the in-flight phase and a current pressure of the bleed air at a current altitude.

15. The method of claim 9, further comprising selecting the second position in response to determining the transition is from a cruise in-flight phase to a descent in-flight phase.

16. The method of claim 9, wherein the in-flight phase is determined according to a step-climb scheme.

* * * * *